J. T. FOSTER.
Flour-Sieves.
No. 137,906. 
Patented April 15, 1873.
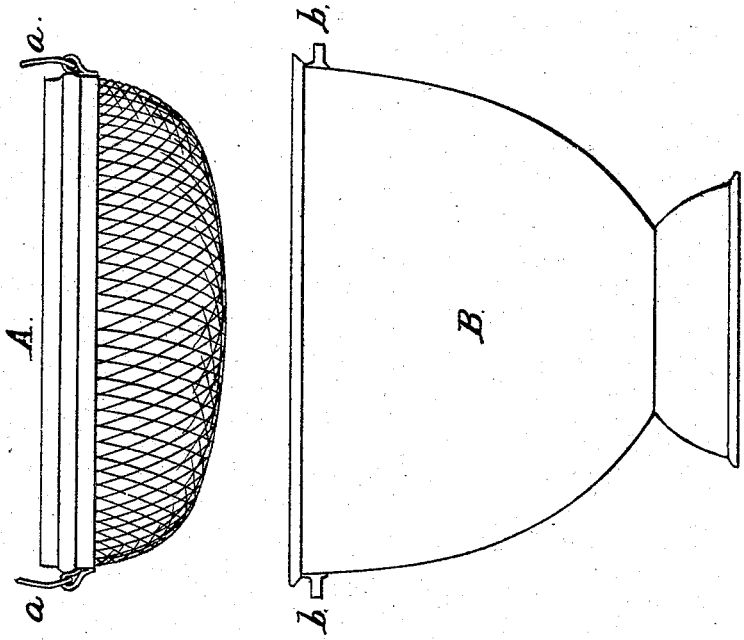
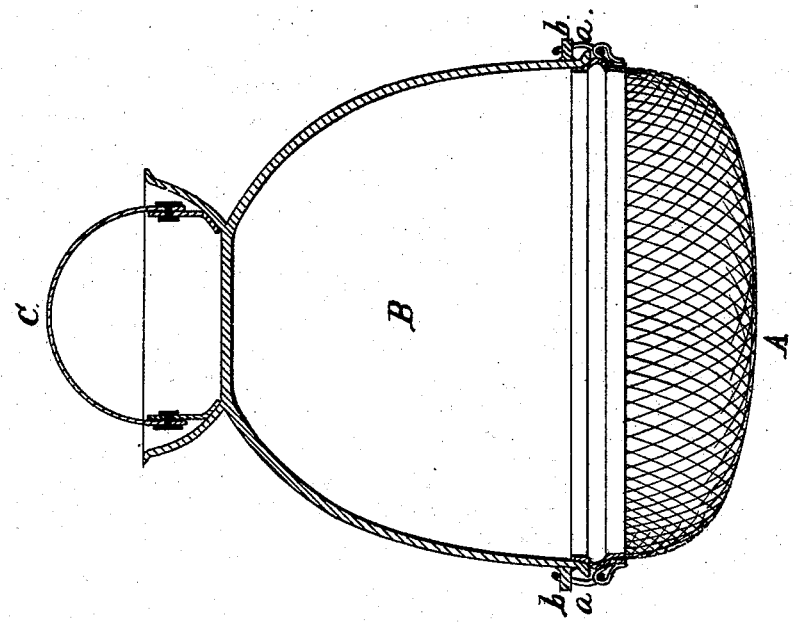
Witnesses:
H. A. Daniels
Chas H. Isham
Inventor:
John T. Foster.
By G. B. Towle Att.
A.M. PHOTO-LITHOGRAPHIC CO. N.Y. (OSBORNE'S PROCESS.)

UNITED STATES PATENT OFFICE.

JOHN T. FOSTER, OF JERSEY CITY, NEW JERSEY, ASSIGNOR TO HARRY T. FOSTER AND LUCIEN MILLS, OF SAME PLACE.

IMPROVEMENT IN FLOUR-SIEVES.

Specification forming part of Letters Patent No. 137,906, dated April 15, 1873; application filed February 5, 1873.

*To all whom it may concern:*

Be it known that I, JOHN T. FOSTER, of Jersey City, in the county of Hudson and State of New Jersey, have invented certain new and Improved Flour Sifter and Strainer; and I do hereby declare the following to be a full, clear, and exact description of the invention, such as will enable others skilled in the art to which it pertains to make and use it, reference being had to the accompanying drawing which forms part of this specification.

Figure 1 is a vertical sectional view. Fig. 2 is a view showing the sieve detached from the bowl or dish. Fig. 3 is a side view of the bowl.

Like letters in all figures of the drawing indicate like parts.

This invention relates to the combination of a removable sieve with a bowl or dish so as to sift the flour into the bowl from the outside of the sieve instead of from the inside as ordinarily, thus avoiding all liability of wasting or scattering the flour.

A is a concave sieve having its rim made to fit snugly within the rim of the bowl B, the sieve being placed in an inverted position over the latter. The rim of the sieve is provided with hooks or rings $a\ a$, which are placed over pins $b\ b$ attached to the sides of the bowl so as to securely fasten the sieve onto the same. The bottom of the bowl is provided with the bail C, so that by grasping the latter firmly with the hand, and pressing the sieve gently down into the flour, and giving it a twisting motion at the same time, the flour will be pressed through the sieve into the bowl, thus sifting the flour direct from the barrel or other receptacle containing it without wasting or scattering it.

Ordinarily the flour is put into the sieve and then sifted from it into the bowl. The motion of the sieve and the distance at which it is held from the bowl to enable the sifting to be carried on properly is such that the flour, which being of a light and dry nature, will more or less scatter about, and thus become wasted; but by uniting the sieve with the bowl, and sifting the flour into it in the manner as above described, all liability of the flour being wasted or scattered is thereby avoided. The bowl when filled is turned up, and the sieve removed by releasing the rings from the pins.

The rim at the bottom of the bowl is made deep enough so that the bail will lie within the same out of the way when the bowl is stood upon the table.

The sieve can be used for the purposes of a strainer if desired.

Having thus fully described my invention, what I claim therein as new, and desire to secure by Letters Patent, is—

1. A flour sifter and strainer, consisting of a removable sieve, in combination with a bowl or dish so as to sift the flour into the bowl from the outside of the sieve instead of from the inside, as ordinarily, substantially as described.

2. The removable concave sieve A having rings or hooks $a\ a$, in combination with the bowl B provided with pins $b\ b$, and bail C, substantially as shown, and for the purpose as set forth.

In testimony that I claim the foregoing I have hereunto set my hand and seal this 25th day of January, 1873.

JOHN T. FOSTER. [L. S.]

Witnesses:
J. V. MUIRHEID,
W. L. ROWE.